Sept. 22, 1959     H. A. MARSDEN     2,904,898
TRAINING APPARATUS FOR PRACTICING ARTIFICIAL RESPIRATION
Filed Oct. 7, 1958     2 Sheets-Sheet 1

Herman A. Marsden,
INVENTOR.

BY.

*Billy a. Roblins*

ATTORNEY.

Sept. 22, 1959 H. A. MARSDEN 2,904,898
TRAINING APPARATUS FOR PRACTICING ARTIFICIAL RESPIRATION
Filed Oct. 7, 1958 2 Sheets-Sheet 2

Herman A. Marsden,
INVENTOR.

BY.

ATTORNEY.

United States Patent Office 2,904,898
Patented Sept. 22, 1959

2,904,898

TRAINING APPARATUS FOR PRACTICING ARTIFICIAL RESPIRATION

Herman A. Marsden, Woodland Hills, Calif.

Application October 7, 1958, Serial No. 765,865

7 Claims. (Cl. 35—17)

This invention relates generally to apparatus for practicing artificial respiration, and more particularly to an apparatus which is adapted for training in the art of mouth-to-mouth insufflation.

In the prior art of artificial respiration, it has long been accepted that it is necessary to train persons so that they may become proficient in practicing the particular method of artificial respiration which is chosen. In accordance with this accepted proposition, training must be given in the method of practicing mouth-to-mouth insufflation.

Mouth-to-mouth insufflation is somewhat different from other methods of artificial respiration. The breath of the one performing the mouth-to-mouth insufflation is passed into the mouth and thence the lungs of the victim. The passage of the breath into the lungs of the victim causes the chest to expand and, upon release of the air thereafter, to contract. It is in this manner that the one performing mouth-to-mouth insufflation becomes aware of whether or not air is being properly supplied to the victim.

If mouth-to-mouth insufflation is being performed by a trainee upon a person who is in fact breathing, the chest of that person will rise and fall in accordance with his own natural breathing. The one practicing the mouth-to-mouth insufflation will, therefore, not be aware of the efficacy of his training. Furthermore, many persons who would, in the presently popular methods of artificial respiration, readily submit to being a pretended victim for the purposes of training, would hesitate to do so in the method of mouth-to-mouth insufflation simply because they would not desire the breath of another individual to be passed into their mouths and lungs. This would be particularly true if that person were a stranger.

In addition to the foregoing, in practicing mouth-to-mouth insufflation, it becomes exceedingly important that the head and neck of a victim be in the proper position to permit passage of air into the victim's lungs. It is also important that any foreign matter be removed from the mouth and throat of the victim.

It is, therefore, an object of the present invention to provide a training apparatus which may be used to instruct individuals in the method of mouth-to-mouth insufflation.

It is a further object of the present invention to provide a training apparatus which permits simulation of mouth-to-mouth insufflation in a realistic manner upon a breathing person.

It is yet another object of the present invention to provide a training apparatus which permits simulated practice of mouth-to-mouth insufflation but at the same time precludes the passage of air between the pretended victim and the trainee.

It is a further object of the present invention to provide a training apparatus for instructing in the method of mouth-to-mouth insufflation which is adapted to permit the pretended victim to readily check the actions of the trainee to insure proper instruction.

A training apparatus in accordance with the present invention includes a mouth piece and a resilient means for accepting air. An additional means which defines an orifice is interconnected between the mouth piece and the resilient means.

Additional objects and purposes of the present invention will become apparent from a consideration of the following description taken in conjunction with the accompanying drawings, which are presented by way of example only and are not intended as a limitation upon the apparatus of the present invention, and in which the same numeral is used throughout to indicate the same or similar parts, and in which:

Fig. 1 illustrates the training apparatus of the present invention in use upon a pretended victim;

Fig. 2, being partly in cross-section, illustrates the air flow in training in the method of mouth-to-mouth insufflation with the apparatus of the present invention;

Figure 1:
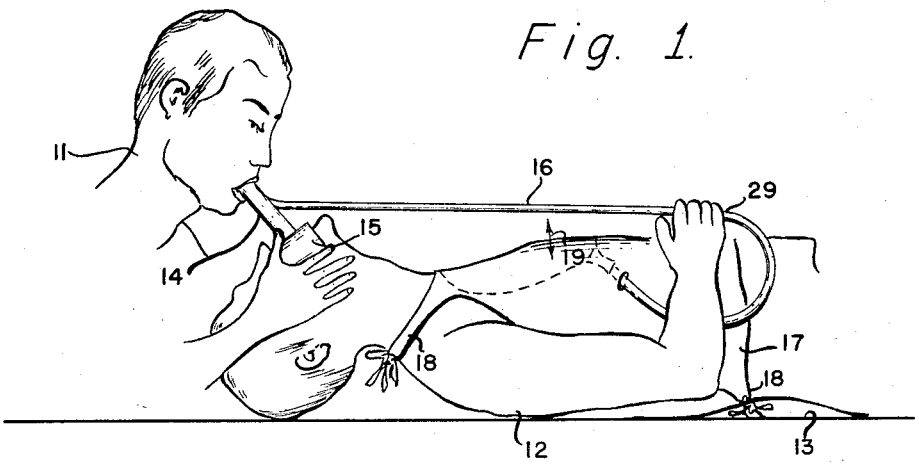

Referring now to the drawings and particularly to Fig. 1 thereof, there is shown a trainee 11 who is practicing mouth-to-mouth insufflation upon a pretended victim 12. In accordance with the presently accepted method of mouth-to-mouth insufflation, the victim 12 is placed upon a floor, table or other support 13.

The neck of the pretended victim is stretched, as illustrated, and the jaws are elevated in the manner shown. The trainee 11 places the mouth piece 14 into the mouth of the pretended victim, pressing it down so that the web portion 15 of the mouth piece 14 provides a seal about the mouth of the pretended victim thereby preventing the escape of air which would normally be passed into the mouth and thence the lungs of the pretended victim.

The trainee 11 thereafter blows his breath into the mouth piece in order to simulate mouth-to-mouth insufflation. The air passes from the mouth piece 14 through a means 16 defining an orifice and into a resilient means which is capable of accepting the air. This resilient means is not shown in Fig. 1, but will be more fully described hereinafter. The resilient means (not shown) is retained in place by a harness 17 which is held firmly in place by a series of straps 18 which are passed behind the body of the pretended victim and tied snugly in place as illustrated.

The passage of air into the resilient means will cause the chest of the pretended victim to rise by way of the harness 17, as indicated by arrow 19. The trainee 11 then removes his mouth from mouth piece 14 allowing the air in the resilient means to pass in the reverse direction out through the mouth piece, thereby causing the chest of the pretended victim to fall as indicated by arrow 19.

Figure 2:
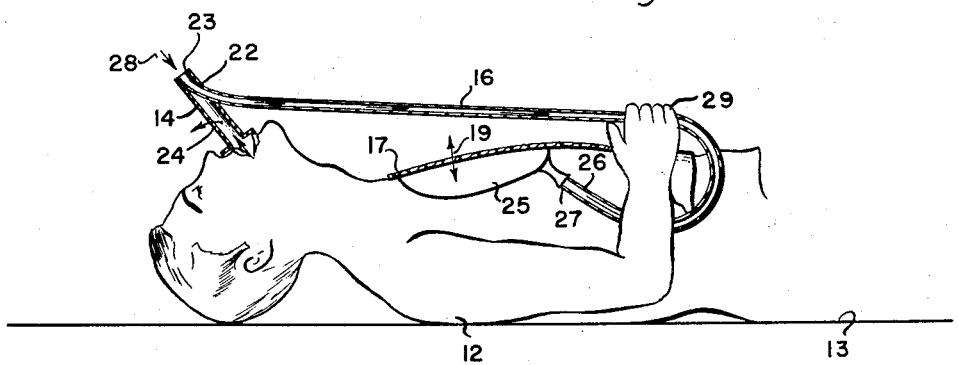

Referring now more particularly to Fig. 2 wherein the actual air flow is more clearly illustrated, it is seen that the means defining an orifice is a tube and, in the presently preferred embodiment of this invention is a flexible tube such as a rubber or pliable plastic tubing. As is shown in Fig. 2, the mouth piece 14 has an opening 22 provided therein. Tube 16 is passed through opening 22 and is forced up and into portion 23 of mouth piece 14. Tube 16, when in this position, completely blocks the normal opening which is provided through mouth piece 14. An additional opening 24 is also provided in mouth piece 14. The purpose of the opening 24 will be more fully described hereinafter. As is illustrated in Fig. 2, tube 16 is connected to the resilient means 25 by way of forcing the end portion 26 of the tube into an opening 27 of the resilient means. The resilient means 25 is placed upon the chest of the pretended victim near the neck as shown in Fig. 2. Harness means 17 is thereafter placed over the resilient means 25 and held in place as above described.

Air is passed into the end portion 23 of the mouth piece 14 as illustrated by arrow 28. The air passes through the tube 16 as shown by the arrow and into the resilient means 25. The air passing into resilient means 25 causes it to expand and thus in turn causes the harness 17 to rise as if the pretended victim 12 were having air forced into his lungs. When the trainee removes his mouth from end portion 23, the pressure provided by the harness 17 upon the resilient means 25 forces the air from resilient means 25 through tube 16 and out end portion 23 of the mouth piece 14 in the reverse direction from that shown by the arrow.

It is seen from the foregoing that the breath of the trainee while performing mouth-to-mouth insufflation with the apparatus of the present invention never enters the mouth or lungs of the pretended victim, but instead passes into the resilient means 25 and out again through tube 16.

As described above, web member 15 of the mouth piece 14 is held firmly in place so as to seal the mouth of the pretended victim. The opening 24 is provided in the mouth piece below the tube member 16 so that the pretended victim may breathe. Air passes from the atmosphere through opening 24 and into the mouth and lungs of the pretended victim and out again as illustrated by the arrow.

As illustrated in Figs. 1 and 2, the pretended victim may during the training of the trainee 11 maintain control over the passage of air into the resilient means 25 by keeping his hand upon the tube 16 as shown at 29. In actual practice the control would be exercised somewhat as follows. If the trainee neglected to check the mouth and throat of the pretended victim to assure the lack of foreign matter in the mouth, the pretended victim would block the passage of air through the tube 16 by pinching it together. The pretended victim could also provide an obstruction to the tube, either wholly or partially, if the trainee neglected to hold the jaws of the pretended victim in the proper position which would in actual practice prevent the proper passage of air into the lungs of a victim.

Figure 3:
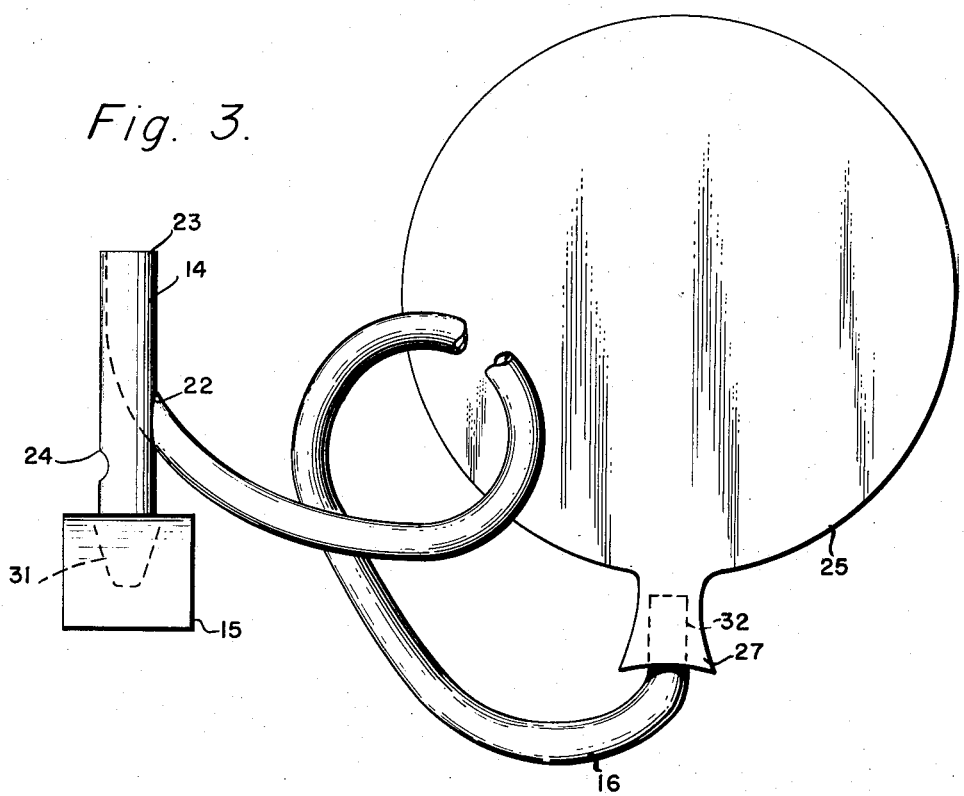
Fig. 3 is an enlarged view of the apparatus of the present invention.

Referring now more particularly to Fig. 3, the mouth piece 14, tube 16 and resilient means 25 are illustrated in greater detail.

In addition to the web portion 15 of the mouth piece 14, wedge-shaped members 31 are provided for insertion into the mouth of the victim. In normal practice, these members define an opening which is a continuation of the opening through mouth piece 14 and permit the passage of air into the victim's mouth and lungs. Mouth piece 14 is preferably of the type described and claimed in co-pending application, Serial Number 750,982, filed July 25, 1958, by the inventor of the present invention. The opening 24 through which the pretended victim breathes is clearly illustrated in Fig. 3. As more clearly shown in Fig. 3, tube 16 is passed through the opening 22 and into mouth piece 14 to seal the end portion 23 thereof. Tube 16 is then passed into the opening 27 of the resilient means 25 as illustrated by the dotted lines 32. Although the resilient member 25 and the tube 16 are shown as separate parts which are brought together, it is to be expressly understood that the resilient means 25 and the tube may be constructed so as to be one integral unit.

The resilient means 25, as illustrated in Fig. 3, may be a bladder-like member which is constructed of rubber. If the wall members of bladder 25 are made sufficiently thin the bladder 25 will readily provide the rising and falling of the chest of the pretended victim without undue pressure being applied by the trainee. It should be understood, however, that bladder 25 may be constructed of any material, such as a flexible plastic or the like, so long as it will provide the desired expansion and contraction as hereinabove described.

Figure 4:
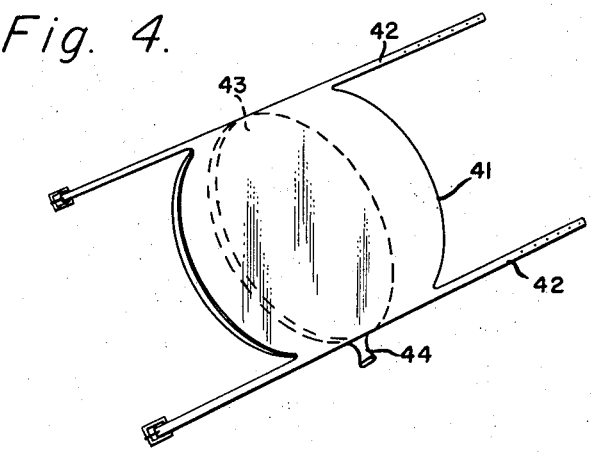
Fig. 4 is an alternative embodiment of a portion of the apparatus of the present invention.

Referring now more particularly to Fig. 4, an alternative embodiment of a portion of the apparatus of the present invention is illustrated. A bib-like member 41 is provided with straps 42 at the end portions thereof. A bladder 43, shown in phantom, may be provided either separately as above described or preferably as an integral part of the bib 41. In actual practice, the bib 41 with integral bladder 43 would be placed upon the chest of the pretended victim and held in place by straps 42, substantially as described with respect to Fig. 1 above. The tube 16 would be inserted into opening 44 of bladder 43 and the training carried out as described above.

Although in the various alternatives as described above, a harness or a bib-like member is provided to apply pressure to the bladder and to indicate to the trainee the rise and fall of the pretended victim's chest, it is to be expressly understood that the bladder may be constructed in such a manner that the desired expansion and contraction can be effected without the use of a harness or bib-like member. As an example, a resilient material may be attached to or made an integral portion of the bladder in a stripe-like fashion so as to provide the desired pressure. Alternatively, the bladder may be constructed of a material which, by its own inherent nature, will readily provide the desired expansion or contraction. In either of the latter embodiments no harness or bib-like member would be required. In such an instance, the bladder would be inserted within the shirt or other clothing of the pretended victim and thereafter the training as above described would be carried out.

There has been thus described a training apparatus which may be utilized in the instruction of mouth-to-mouth insufflation and which precludes the passage of air between a trainee and the pretended victim and provides control by the pretended victim over the trainee.

What is claimed is:

1. A training apparatus for providing instruction in mouth-to-mouth insufflation, said apparatus comprising: a mouth piece having first and second end portions and an opening therethrough, a bladder, a flexible tube interconnecting said mouth piece and said bladder, said tube being inserted into said mouth piece intermediate said end portions to block said opening therethrough and to permit passage of air between said first end portion and said bladder, and means for providing pressure upon said bladder.

2. An apparatus for providing instruction in mouth-to-mouth insufflation by permitting a trainee to practice the mouth-to-mouth insufflation upon a pretended victim, said apparatus comprising: a mouth piece having first and second end portions and an opening therethrough, said first end portion being adapted to fit into the pretended victim's mouth and said second end portion being adapted to fit into the trainee's mouth, a bladder, a flexible tube interconnecting the bladder and mouth piece, said tube being inserted into said mouth piece adjacent said second opening to thereby block said opening through said mouth piece, and means for providing pressure upon said bladder.

3. A training apparatus for instructing in the art of mouth-to-mouth insufflation comprising: a mouth piece including first and second end portions, said first end portion being adapted for insertion into the mouth of a pretended victim and said second end portion being adapted for use by a trainee, an expansible bladder, a flexible tube interconnecting said mouth piece and said bladder, said tube being inserted into said mouth piece to block passage of air therethrough, and a harness for affixing said bladder to said pretended victim, said harness being adapted to provide pressure upon said bladder whereby air passed into said bladder will be readily expelled therefrom.

4. A training apparatus for providing instruction in mouth-to-mouth insufflation, said apparatus comprising:

a hollow mouth piece having a passage therethrough and first and second end portions, a first opening proximate said first end portion, a second opening proximate said second end portion, a flexible tubing inserted in said first opening to thereby block said passage through said mouth piece and provide a connection to said first end portion, a bladder, said tube interconnecting said mouth piece and said bladder, and a harness member for providing pressure upon said bladder.

5. A training apparatus for providing instruction in mouth-to-mouth insufflation by permitting a trainee to practice mouth-to-mouth insufflation upon a pretended victim, said apparatus comprising: a mouth piece having first and second end portions, said first end portion being arranged for use by said pretended victim and said second end portion being arranged for use by said trainee, expansible means for receiving and exhausting air, and conduit means affixed to said mouth piece adjacent said second end portion and adapted for attachment to said expansible means to prevent the passage of air between said trainee and said pretended victim.

6. A training apparatus for providing instruction in mouth-to-mouth insufflation by permitting a trainee to practice mouth-to-mouth insufflation upon a pretended victim, said apparatus comprising: a mouth piece having first and second end portions, said first end portion being arranged for use by said pretended victim and said second end portion being arranged for use by said trainee, means disposed intermediate said first and second end portions for preventing the passage of air between said trainee and said pretended victim, expansible means for receiving and exhausting air, and conduit means affixed to said mouth piece adjacent said second end portion and connected to said expansible means to permit said trainee to force air into said expansible means.

7. A training apparatus for providing instruction in mouth-to-mouth insufflation by permitting a trainee to practice mouth-to-mouth insufflation upon a pretended victim, said apparatus comprising: a mouth piece having first and second end portions and an opening therethrough, said first end portion being adapted to fit into the pretended victim's mouth and said second end portion being adapted to fit into the trainee's mouth, a harness member including a bladder as an integral part thereof, and a flexible tube interconnecting said bladder and said mouth piece, said flexible tube being inserted into said mouth piece adjacent said second opening to thereby block said opening through said mouth piece.

References Cited in the file of this patent

UNITED STATES PATENTS

| | | |
|---|---|---|
| 402,779 | Steinhoff | May 7, 1889 |
| 2,762,366 | Huxley et al. | Sept. 11, 1956 |